United States Patent
Kalb et al.

(10) Patent No.: US 6,198,175 B1
(45) Date of Patent: Mar. 6, 2001

(54) SWITCHING DEVICE AND PROCESS FOR EXTERNAL FORCE-ACTUATED DRIVING DEVICES IN A MOTOR VEHICLE

(75) Inventors: Roland Kalb, Grossheirath; Günter Bittner, Niederfüllbach, both of (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 09/091,537

(22) PCT Filed: Dec. 17, 1996

(86) PCT No.: PCT/DE96/02469

§ 371 Date: Jun. 18, 1998

§ 102(e) Date: Jun. 18, 1998

(87) PCT Pub. No.: WO97/22984

PCT Pub. Date: Jun. 26, 1997

(30) Foreign Application Priority Data

Dec. 18, 1995 (DE) .............................. 195 48 659

(51) Int. Cl.⁷ ........................................... B60J 1/17
(52) U.S. Cl. .................. 307/10.1; 318/286; 318/445; 318/671
(58) Field of Search ................... 307/10.1; 318/445, 318/663, 286, 671, 437, 543; 49/506; 701/49

(56) References Cited

U.S. PATENT DOCUMENTS

| | | |
|---|---|---|
| 3,514,670 | 5/1970 | Isaacs . |
| 3,621,162 | 11/1971 | Wall . |
| 4,253,004 | 2/1981 | Oka . |
| 4,377,004 | 3/1983 | Wassink . |
| 4,459,521 * | 7/1984 | Barge .................................... 318/445 |
| 4,554,763 | 11/1985 | Dauvergne . |
| 4,940,926 | 7/1990 | Periou . |
| 5,149,924 | 9/1992 | Priesemuth . |
| 5,423,227 | 6/1995 | Polaert et al. . |
| 5,912,537 * | 6/1999 | Yang .................................... 318/663 |
| 5,945,796 * | 8/1999 | Ohmori et al. ....................... 318/266 |
| 5,983,567 * | 11/1999 | Mitsuda ................................ 49/26 |

FOREIGN PATENT DOCUMENTS

| | | |
|---|---|---|
| 2757593 | 7/1979 | (DE) . |
| 8130371 | 10/1981 | (DE) . |
| 3039346 | 5/1982 | (DE) . |
| 3532574 | 3/1987 | (DE) . |
| 3736400 | 5/1989 | (DE) . |
| 4404594 | 8/1995 | (DE) . |
| 2484168 | 12/1981 | (FR) . |

* cited by examiner

Primary Examiner—Albert W. Paladini
(74) Attorney, Agent, or Firm—Christie, Parker & Hale, LLP

(57) ABSTRACT

A switching device and process for external force-actuated driving devices in a motor vehicle, especially windows and sliding roofs. Depending on the dynamics and/or degree of displacement of an actuating component, control signals are generated which code the displacement speed and travel, the position, the displacement duration and/or direction of the item to be displaced. The actuating component is preferably an unrestrictedly rotatable component which, during its rotation, generates control signals for an electronic control unit. The device and process give a user the greatest possible control over the displacement of the component.

36 Claims, 11 Drawing Sheets

SWITCHING DEVICE AND PROCESS FOR EXTERNAL FORCE-ACTUATED DRIVING DEVICES IN A MOTOR VEHICLE

FIELD OF THE INVENTION

The invention relates to two switching devices and a process for controlling external force actuated driving devices of a motor vehicle.

BACKGROUND OF THE INVENTION

Switching devices are already known from the prior art such as touch switches, rocker switches, pressure switches or pull switches which have defined on and off switching states. An electric displacement drive which is to be switched by a switch of this kind consequently knows only two switching states: switched on and switched off.

An exception to this is the rotary switch and sliding switch with integrated potentiometer. With defined end positions of the potentiometer or rotary switch which correspond to the end positions of an object to be displaced a normally linear area is formed between the end positions where a signal clearly determined by the position of the rotary switch is issued by the rotary switch. Absolute positions of the object being displaced are thereby allocated to the potentiometer values. It is thereby possible for example when adjusting a window pane by means of an electric window winder drive to set and preselect intermediate positions of the window pane.

Known rotary switches with integrated potentiometer do not allow however a control over the displacement, more particularly the dynamic characteristic values of the displacement of an object being displaced, from each and every switch position. More particularly it is not possible to control the displacement speed and fine adjustment of the displacement. Also the possibility of controlling the displacement speed of an adjustment would considerably increase the general operating comfort.

A switching device according to the preamble of claim 1 is known from European Patent EP A 0 324 291. This relates to an ideal value transmitter for controlling the position of an object with an endlessly rotatable control button which during rotation of the control button produces impulses whose number is proportional to the turning angle of the button. An ideal value relating to the position of the object to be controlled is detected from the number of impulses received, the position of the object to be controlled and the direction of movement. The number of impulses received is thereby calculated from the ratio between the turning angle of a displacement undertaken and the maximum angle accessible for an operator so that the impulses produced code the path which the object to be controlled is to run through starting from the starting position.

French Patent FR A 2 484 168 describes an electrical switching device for a window winder device with an operating element which can swivel in both directions and which depending on the swivel direction causes a closing or opening of a window pane. It is thereby proposed that with a short activation of the operating element the window pane is displaced at high speed. With a long activation of the operating element the window pane is displaced at a slower speed. Corresponding current circuits are provided for this.

German Patent DE 44 04 594 A1 discloses an operating device for steering, accelerating or braking a motor vehicle with an operating element which has a defined neutral position and starting from the neutral position can be displaced in two deflection directions. An adjustment of the steering, of the engine or braking system of the motor vehicle is carried out in dependence on the degree of deflection of the operating element from its rest position or in dependence on the time length of the deflection of the operating element.

From German Patent DE 35 32 575 A1 an electric switch is known for a drive motor with an operating slider. The operating slider is in active connection with a sliding resistance as well as an associated control electronics so that the sliding path of the operating slider is directly proportional to the displacement path of a sliding roof, window or the like.

German Patent DE 37 36 400 A1 discloses a safety device for movable parts, more particularly for window winders and sliding roofs of motor vehicles. A movable part such as a window pane is moved into a closed position by means of a drive motor over a dangerous clamping area where foreign bodies can be clamped between the movable part and a resting part. The displacement speed is thereby reduced in the dangerous clamping area during closing of the movable part.

SUMMARY OF THE INVENTION

The object of the invention is to provide a switch device and a process for controlling an external force actuated displacement drive in a motor vehicle which allows the operator not only to determine the end values of a displacement but also to have the greatest possible influence on the displacement of the object being displaced, more particularly to influence the displacement speed.

This is achieved according to the invention through a switching device with the features of claim 1, alternatively through a switching device with the features of claim 16 as well as through a process with the features of claim 26.

The solutions according to the invention propose adjusting the displacement speed of the displacement drive or an object to be displaced in dependence on the frequency of a control signal impulse sequence which is produced during rotation of the operating element through associated signal producing means. The frequency or period duration of the control signal impulse sequence and thus the dynamics of a displacement is thereby provided by the user through a corresponding operation of the operating element. The greatest possible individual influence on the displacement of an object to be displaced is thereby possible. In particular it becomes possible to influence the displacement speed and thus the positioning accuracy.

The frequency of the control signal impulse sequence is in the case of a rotatable operating element thereby dependent on the speed of rotation of the operating element and in the case of an operating element with definite neutral position dependent on the dynamics and/or degree of displacement of the operating element from its rest position. By dynamics of a displacement of the operating element is meant the speed or acceleration of the displacement. By degree of displacement of the operating element is meant in particular the displacement path, i.e. the deflection of the operating element during a displacement or the deflection angle.

It is likewise within the scope of the invention that when using an operating element with definite neutral position in dependence on the degree and/or dynamics or the displacement of the operating element a resistance value and/or voltage value and/or current value is formed. A resistance-dependent value can be produced for example through expansion measuring strips and a voltage-dependent value can be produced by means of a piezo element. The relevant value is supplied to the control unit and represents a control signal on the basis of which the displacement speed is determined. With a change in the degree and/or dynamics of the displacement of the operating element the resistance value or voltage or current value changes accordingly.

The invention allows the dynamics of the displacement of the displacement drive to be individually determined through the dynamics of a displacement of the operating element. By way of example a rapid rotation of a rotatable operating element, such as a rotatable wheel leads to a high frequency of the control signal impulse sequence and thus to a corresponding high displacement speed of the displacement drive or of the object to be displaced, such as a window pane. The exact dependence between the frequency of the control signal impulse sequence and the displacement speed of the displacement drive can thereby be fixed in a suitable way. By way of example a proportional dependence is carried out, i.e. the displacement speed of the displacement drive is proportional to the speed of displacement of the operating element provided by the user. In another example a discreet association takes place, i.e. certain displacement speeds of the displacement drive are associated with certain speed ranges of the displacement of the operating element and frequency ranges of the control signal impulse sequence determined therewith.

The electronic control unit determines from the properties of the control signal impulse sequence the displacement speed as well as the displacement path, the position and the displacement duration of the displacement of an object to be displaced, and/or by means of a suitable rotary direction, recognition determines the direction of a displacement, e.g. by using echo sensors. More particularly the frequency of the impulse sequence codes the speed, and number of impulses within a certain time interval codes the exact displacement path of a displacement of the object to be displaced.

The invention thus makes it possible to generate control signals which code the exact displacement course and not only the information "ON" and "OFF" and "UP" and "DOWN" respectively.

The information in the control signals is converted in an electronics control unit into control commands for the drive motor of the displacement drive. A regulated motor current is hereby supplied to the drive motor in dependence on the control signals so that the drive shaft of the drive motor is operated at a certain speed in the desired direction of rotation. The rotational movement of the motor shaft is converted through gearing into a translation movement of the object to be displaced. A rapid or slow displacement of the object being displaced is carried out according to the dynamics of the displacement of the operating element.

In a preferred embodiment of the invention signal-producing or signal-changing elements are mounted on the operating element or on a part mechanically connected to the operating element. These interact in order to produce a signal with corresponding sensor elements such as echo sensors, light diodes or electrical sliding contacts which produce control signals for the electronic control unit in dependence on the displacement of the operating element.

An impulse sequence is thereby produced whose properties represent a measure for the displacement speed, displacement path, position and duration of displacement of an object to be displaced. The duration of displacement is preset by the user through the length of time operating the operating element. The position of the displacement object to be achieved is based on the starting position and displacement path.

When using a signal-producing element a signal is produced on the sensor element during movement of the signal-producing element and when using a signal-changing element on the sensor element an existing basic signal is changed during movement of the signal-changing element.

In an advantageous further development of the invention the electronic control unit generates control commands for the drive motor not only in dependence on the control signals of the switching device but also in dependence on the position of the object to be displaced as well as on further control signals which are produced from a direct or indirect monitoring of an adjustment process of the displacement object and relate for example to speed changes of the displacement object caused by external forces. By taking into account also the position of the object to be displaced as well as further monitoring signals it is possible to allow for special features during displacement.

In a preferred embodiment the operating element is formed as an endlessly rotating wheel without absolute neutral position and without defined switched on and switched off states in relation to a certain rotary position of the wheel. The signal-producing or signal changing elements are formed on a wheel or on a disc which is connected rotationally secured to the operating element. As signal-producing or signal-changing elements are preferably used magnetised areas of the wheel or disc, alternatively perforated or slit panels or conductor panels biased with voltage which are in alternating action in order to produce a signal with at least one echo sensor, a light barrier or with electrical sliding contacts. A further sensor channel is to be used to govern or detect more than one direction of movement.

The use of an endlessly rotating wheel as the operating element allows a position-related or dynamically controllable displacement of the operating element. With a displacement which is to be carried out the wheel is turned starting from the momentary rest position at a certain speed into the desired direction. This leads to a displacement of the object to be displaced corresponding to the desired turning direction and the rotation of the wheel carried out. In this way the object to be displaced can be moved slowly or quickly at will. If now signals are produced a rest or OFF position is thereby fixed.

In a further development of the invention the displacement of the object to be displaced does not directly follow the speed values or degree of displacement of the operating element, but rather a function of these speed values with which a certain impulse frequency of the control signal impulse sequence corresponds. More particularly an association is made so that impulse frequencies of the control signal impulse sequence lying below a first value are allocated a speed which is dependent on the impulse frequency and is correspondingly variable and which is at least equal to a predetermined minimum displacement speed.

Through the electronic control unit impulse frequencies lying between this first value and a second value are allocated a constant mean displacement speed and impulse frequencies lying above the second value are allocated a maximum displacement speed. Thus exceeding a predetermined rotational speed of the wheel and a correspondingly high impulse frequency of the control signal impulse sequence are interpreted by the electronic control unit to the effect that the object to be displaced is to be moved with the maximum displacement speed into an end position.

In a further development of the invention the operating element which is designed as an endlessly rotating wheel is connected rotationally secured to a segmented magnetic disc whose magnetised segments represent signal-producing elements. The control signal production takes place through two echo sensors which are mounted close to the magnetic disc. A second disc has a rotary axis which lies on a straight line with the rotary axis of the magnetic disc and which has a permanent magnet. A magnetic force coupling exists between the segmented magnetic disc and the permanent magnet which leads to a control of the drive motor initiated through the operating element and a rotation connected therewith of the second disc through the magnetic force coupling to an entrainment and continuous rotation of the magnetic disc and thus to a likewise continuing control of the drive motor.

This allows a continuing displacement of an object to be displaced up to reaching an end stop, namely independently of a continuing manual operation of the operating element. The user must only tip on the operating element and thus initiate an automatic run. The worm wheel of the displacement drive is preferably provided as the second disc.

The invention makes it possible to mount the switching device according to the invention decentralised from the drive unit. The switching device is thereby connected in one variation through electric cable to the drive unit. Alternatively the signal-producing or signal-changing part is mounted directly on the drive motor. In this case a flexible shaft is preferably provided which produces a mechanically coupled rotary movement between the operating element and the signal-producing or signal-changing part. By designing the connection of the operating element and the signal-producing or signal-changing part as a flexible shaft it becomes possible to adapt to the existing geometry of the supporting parts and where applicable to undertake tolerance compensation.

Advantageously the switching device has a deactivating switch through which the switching device can be deactivated so that an undesired displacement of the displacement object can be avoided.

In an alternative embodiment of the invention the operating element is formed as an unrestrictedly rotatable ball which for signal production preferably has a regular magnetic pattern and which is mounted in the manner of a track ball so that it can be adjusted manually by a user in any way.

A switching device with track ball according to the invention is thereby preferably used for a mirror drive of a motor vehicle since by rotating the track ball a tilting of the mirror in several axes can be coded directly. To this end the swivel movement of the track ball in the y-direction and z-direction is detected through corresponding sensor elements and the corresponding control signals are sent to the electronic control unit which converts the control signals into control commands for the drive motor of the mirror drive, resolved in swivel movements of the mirror about the y and z axis.

The switching device according to the invention is preferably used both for a mirror drive and for a window winder drive of a motor vehicle wherein a reverser switch is provided for selecting the mirror drive or window winder drive. When used for a window winder drive only the movement of the track ball about an axis is evaluated.

Alternatively the track ball is movable not in just any way but only about a fixed axis so that there are no fundamental differences from the design of the operating element as a wheel.

In a further development of the invention the operating element is formed as an articulated lever, a tilt switch or as a sliding element mounted in a slide guide with defined neutral position which can be adjusted in at least two deflection directions starting from the neutral position. Control signals are thereby produced with a frequency which depends on the degree of displacement of the operating element, that is the deflection of the operating element from the neutral position.

Further preferred and advantageous developments of the switching device according to the invention and the process according to the invention are characterised in the subclaims.

BRIEF DESCRIPTION OF THE DRAWINGS

The invention will now be explained with reference to several embodiments shown in the drawings in which.

DETAILED DESCRIPTION

Figure 1:
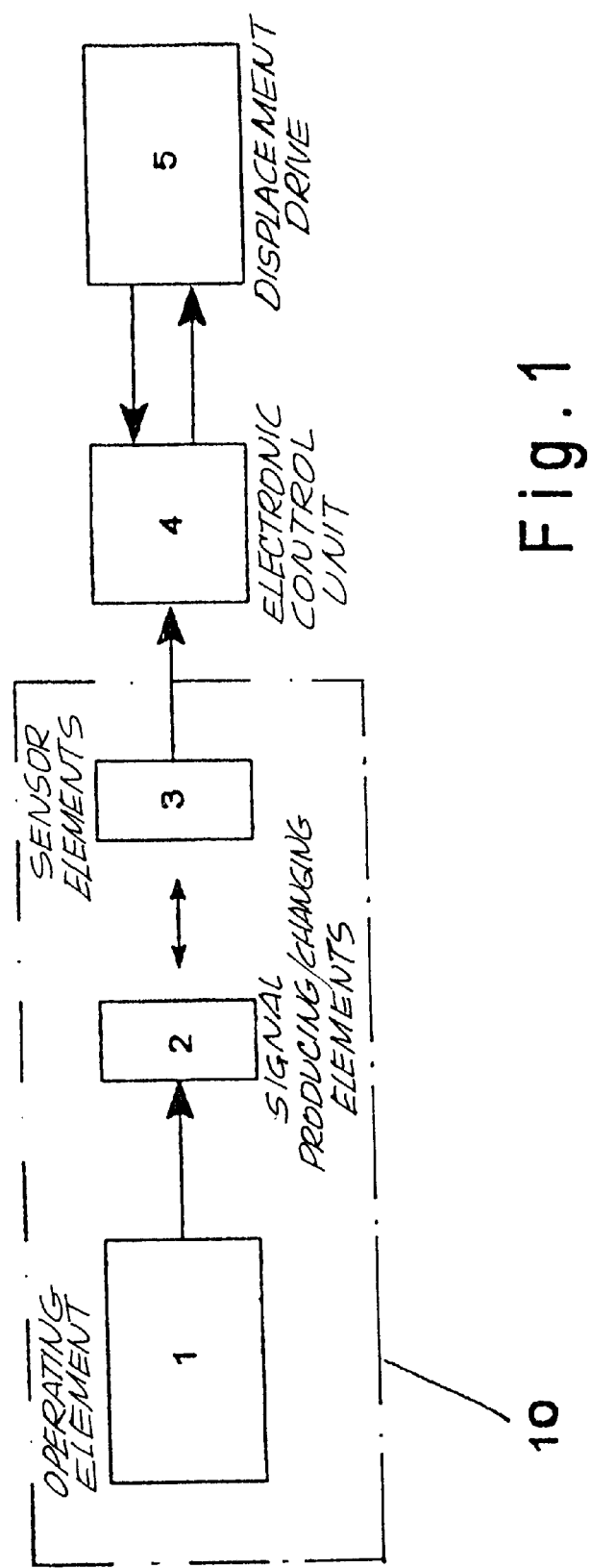
FIG. 1 is a diagrammatic block circuit diagram of a switching device according to the invention.

FIG. 1 shows diagrammatically the arrangement of a switching device 10 according to the invention with an electronic control unit 4 and an external force actuated displacement drive 5. The displacement drive 5 can be driven electrically, pneumatically or hydraulically. The switching device 10 consists of a manually operable operating element 1 as well as means for producing a signal which are associated with the operating element 1. The operating element 1 can be displaced over an area which, in a first embodiment of the invention, is restricted, and in a second embodiment of the invention is unrestricted. Preferably both the displacement of the operating element 1 and the displacement of the displacement object itself, such as a window pane, take place infinitely.

The means for producing a signal consist of signal-producing or signal-changing elements 2 sensor elements 3 interacting with each other. A signal is produced or an existing basic signal is changed at the sensor elements 3 by means of the signal-generating or signal-changing elements 2 coupled with the operating element 1 in dependence on the speed of displacement of the operating element 1 or in dependence on the absolute position of the operating element 1. The control signal produced has a variable frequency which depends directly on the dynamics or degree of displacement of the operating element.

The switching device 10 is electrical load current.

The control signals are sent to an electronic control unit 4 which has an arithmetic-logic unit. The electronic control unit 4 produces, in dependence on the incoming control signals, control commands for the adjustment drive 5. The incoming control signals code the displacement speed, displacement travel, position, duration of displacement and/or direction of displacement of an object to be displaced whereby the interpretation of the control signal is carried out through the electronic control unit 4.

The displacement drive 5 has a drive motor and a gearing which transfers the rotational movement of the drive shaft of the drive motor into a translation movement of the object to be displaced so that the desired displacement of the object to be displaced is carried out. A regulated motor current is sent to the drive motor according to the provision of the control commands. A position-related or dynamically controllable displacement of the displacement object is carried out according to the coded values.

The production of control commands for the displacement drive 5 preferably does not however solely depend on the control signals of the switching device 10. Rather the electronic control unit 4 is supplied in known way with further control signals. More particularly the drive motor is associated with a device for detecting position which detects the revolutions of the motor shaft and produces at least one impulse per revolution at the electronic control unit.

The position of the object being displaced, such as a window pane, is arrived at from the absolute number of signals issued. Furthermore a time-dependent evaluation of the signals issued by the device for position detection takes place in the electronic control unit 4 so that an externally actuated change of the speed of the displacement object is recognised. Furthermore the electronic control unit 4 is supplied where applicable with control signals from monitoring sensors which are part of a direct detecting jam protection system.

End positions are smoothly reached by taking into account the position of the element to be displaced. Consideration of additional sensor signals of sensors in the drive makes it possible to ascertain obstructions during the displacement action.

Figure 2:
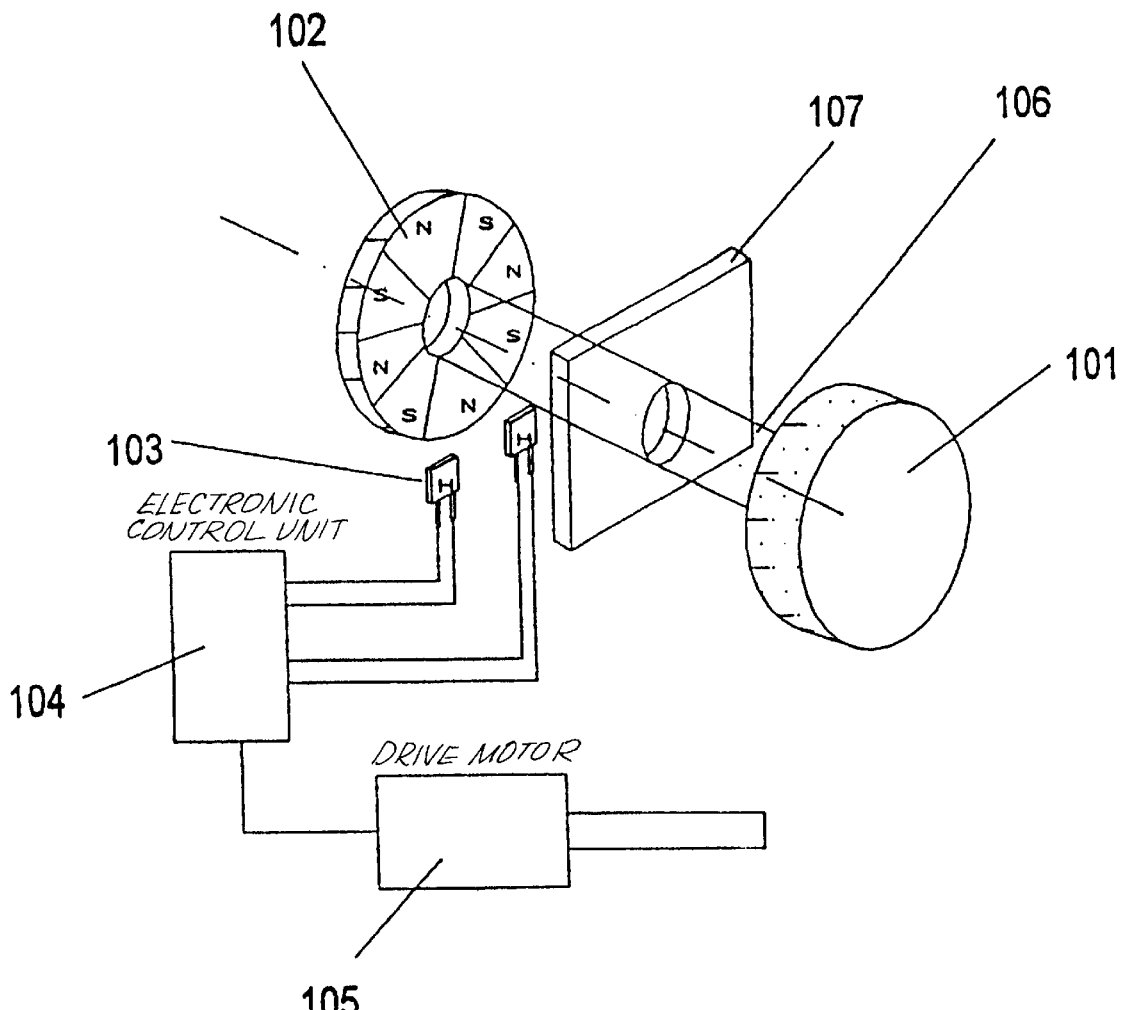
FIG. 2 is a first embodiment of a switching device according to the invention wherein the operating element is coupled to a magnetic disc.

FIG. 2 shows a first embodiment of the switching device according to the invention. A manually operated operating element 101 is formed as an unrestrictedly rotating setting wheel which has no associated fixed on/off states and no absolute neutral position. The setting wheel 101 is connected rotationally secured to a magnetic disc 102 through a fixed axis 106. The magnetic disc 102 is thereby mounted behind the inside door lining 107 of a motor vehicle door. The magnetic disc 103 has in alternation N-magnetised and S-magnetised areas. Two echo sensors 103 are mounted at the side of the magnetic disc 102 and are connected to an electronic control unit 104 to produce control commands for a drive motor 105.

During rotation of the rotatable wheel 101, as a result of the rotationally secured coupling, the magnetic disc 102 is turned through the fixed axis 106. During rotation of the magnetic disc 102 the two echo sensors 103 mounted at the side of the magnetic disc 102 are each traversed by a variable magnetic field. The frequency of the change of the magnetic field is thereby determined by the rotational speed and the number of magnetised areas of the magnetic disc 102. The greater the number of magnetised areas of the magnetic disc 102 the higher the rotation of the magnetic disc 102 is resolved.

The magnetic field changes occurring at the two echo sensors 103 during a rotation of the magnetic disc 102 are converted into two binary impulse sequences off-set from each other according to the angular spacing of the echo sensors 103. The magnetic flux density adjoining each echo sensor 103 produces an echo voltage which is substantially proportional to the magnetic flux density which in known way is converted by an integrated Schmitt trigger (not shown) into a binary impulse sequence. By counting the impulse number per unit time it is possible to determine the rotational speed and by comparing the two impulse sequences it is possible to determine the direction of rotation of the magnetic disc 102 and thus of the operating element which is formed as a setting wheel 102.

The magnetic disc 102 which is connected rotationally secured to the setting wheel 101 represents a signal-producing element which is in alternating action with the associated echo sensors 103 in order to produce a signal wherein during a rotation of the magnetic disc 102 control signals are produced for the electronic control unit 104.

The electronic control unit 104 determines by counting the impulse number per unit time (impulse frequency) the rotational speed and by comparing the two impulse sequences the rotational direction of the magnetic disc 102 and the setting wheel 101 connected rotationally secured to the magnetic disc 102. On the basis of these values control commands are produced for the drive motor 105 and a corresponding motor current is sent to the motor. In this way it is possible by operating the wheel 101 to control directly the control of the drive motor 105 and thus at each time point the speed of displacement of an displacement object.

With a slow turning of the wheel 101 into a certain direction the displacement object is displaced in the corresponding direction and at a slow speed corresponding to the slow rotation of the setting wheel 101. For example with a window winder drive a slow 90 degree turn of the setting wheel 101 corresponds to a pane stroke of 1 cm. With a rapid rotation of the setting wheel 101 a rougher displacement of the window pane is achieved with a comparatively greater displacement speed. In this case a 90 degree turn of the switch corresponds for example to a pane stroke of 10 cm.

The displacement path of the window pane (pane stroke) is clearly determined by the rotational speed of the setting wheel 101 which is selected by the user and the duration of one turn of the setting wheel 101.

Alternatively the electronic control unit 104 does not send the speed values of the magnetic disc 102 directly to the drive motor 105. Rather the frequencies of the impulse sequence are associated with certain speeds of a displacement of the object to be displaced through the electronic control unit 104.

Figure 15:
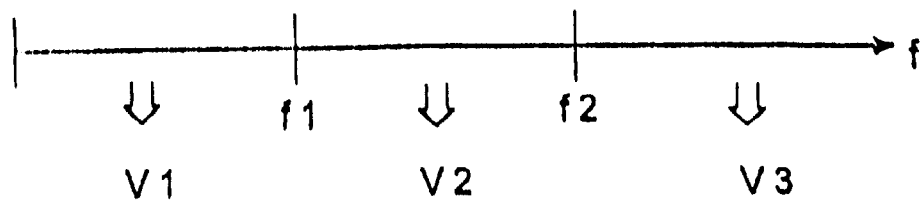
FIG. 15 shows a division of the frequencies of a control signal impulse sequence into three areas associated with different displacement speeds of the displacement object.

An example of associating the frequencies of the impulse sequence with certain speed values of a displacement of the object to be displaced is shown diagrammatically in FIG. 15. The possible impulse frequencies are divided into three areas. The first area passes from 0 to a value f1; the second area from the value f1 to a value f2; the third area comprises all frequencies which are greater than the value f2. The electronic control unit 104 assigns a predetermined constant minimum displacement speed V1 to impulse frequencies lying below the first value f1. In this area there is a reduced translation ratio between the displacement of the operating element 101 and the travel path of an object to be displaced. The minimum speed V1 amounts to a fraction of the usual speed for displacing the corresponding object.

An accurate positioning of the object to be displaced is possible in this first area in a simple way. The impulses produced during one revolution of the setting wheel 101, are counted and from this, starting from the known position of the displacement object, a certain displacement path is determined. Since the minimum speed V1 is fixed by turning the setting wheel 101 about a certain angle it is possible to preselect a certain position. By way of example a 90 degree turn of the setting wheel 101 could correspond to a pane stroke of 1 cm. Accurate positioning of the displacement object is possible through the slow minimum speed in the area considered between 0 and f1.

If the frequency of the impulse sequence lies between the value f1 and the value f2 this frequency is assigned a constant mean displacement speed V2. Here the translation ratio between the displacement of the operating element 101 and the travel path of the displacement object is greater. The mean displacement speed V2 corresponds with a window winder drive roughly to the usual displacement speed for adjusting the window pane. Since the displacement speed V2 is constant it is also possible through a rotation of the setting wheel 101 about a certain angle to set a certain displacement path and select a certain position.

If the impulse frequency of the control signal impulse sequence lies above the value f2 the electronic control unit 104 interprets the high impulse frequency as a command to move the window pane at maximum displacement speed V3 into one of the end positions, that is up to the upper or lower stop. The speed V3 with which the end positions are reached corresponds to the maximum displacement speed which is to be reached. However the usual displacement speed V2 can however also be retained.

In alternative embodiments it is proposed that the electronic control unit 104 assigns the frequencies of the impulse sequence only partially to a fixed displacement speed of the displacement object. By way of example it can be proposed that impulse sequences with a frequency in the range between 0 and f1 are not associated with a minimum speed but in dependence on the actual impulse frequency a variable speed. A slow or rapid rotation of the wheel 101 causes a correspondingly slow or rapid displacement of the displacement object. This allows to a high extent individual displacement of the displacement object. Finally through the electronic control unit 104 it is possible to reach any association of the impulse frequencies to displacement speeds of a displacement of the displacement object.

As can be seen from FIG. 15 the displacement speed coded by the impulse frequency of the control signal is not necessarily converted directly into a corresponding displacement speed of the displacement object but a function of the impulse frequency is formed by the electronic control unit 104 which allocates a fixed maximum displacement speed to frequencies which exceed a certain value.

The embodiment of FIG. 2 is preferably used for a window winder drive or a sliding roof in conjunction with an indirect anti-jam protection measure. To this end, by means of a device for detecting position in known way the rotary direction and rotary speed of the drive shaft of the drive motor 105 are detected. A time-dependent evaluation of the signals issued by the device for detecting position takes place in the electronic control unit 104 so that a change in the speed of the window pane or sliding roof caused by a jamming process is detected and further displacement is stopped immediately.

It should be pointed out that the first embodiment of the switching device 10 according to the invention described here is not restricted to the use of a segmented magnetic disc 102. Rather any signal-producing and signal-changing elements can be used.

Figure 3C:
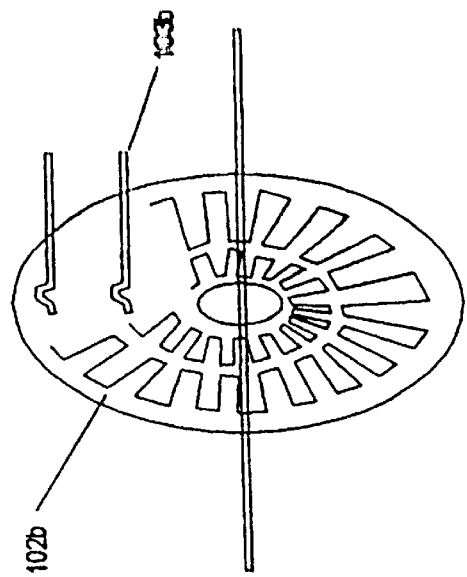
FIG. 3c shows a second signal-producing element with associated electrical sliding contacts.
Figure 3B:
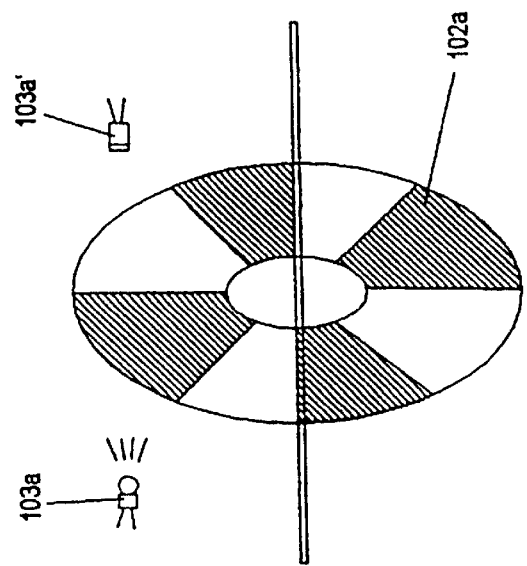
FIG. 3b shows a first signal-changing element with an associated optical sensor.
Figure 3A:
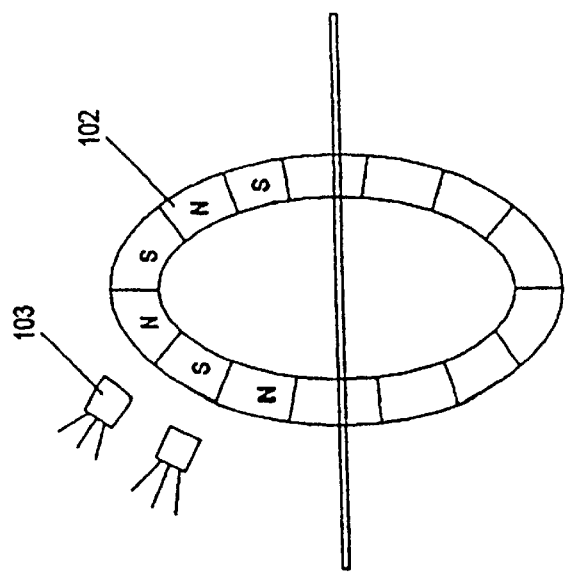
FIG. 3a shows a first signal-producing element with associated echo sensors.

FIGS. 3a to 3c show examples for possible signal-producing and signal-changing elements. FIG. 3a shows in turn a segmented magnetic disc 102 wherein the magnetised segments are only mounted along the outer ring of the magnetic disc 102. Again the magnetic disc 102 is assigned two echo sensors 103 which during rotation of the magnetic disc 102 are each traversed by a variable magnetic field. The use of magnetic disc 102 and echo sensors 103 as signal-producing element and corresponding sensor elements is particularly suited if echo elements are used in any case for evaluating and controlling the motor movement.

In FIG. 3b a disc 102a connected rotationally secured to a setting wheel has slit panels which during rotation of the disc 102a pass intermittently between a light source 103a and a light diode 103a' serving as sensor element. Alternatively the rotary disc 102a has perforated panels. Again a binary impulse sequence is formed which is supplied to an electronic control unit 104. In order to allow a detection of the rotary direction a disc 102a is provided for example which is coded with rotary direction. Alternatively two off-set arrangements of light source 103a and light diode 103a' can be provided.

The disc 102a represents a signal-changing element which changes the lighting of the light diode 103a' as a basic signal. The light frequency of the light diode 103a' is selected so that interference in the daylight is excluded. The use of slit or perforated panels in conjunction with light diodes is particularly favourable if the danger of soiling is extremely small. Otherwise the control signal produced can easily have a high proportion of flickering. The light diodes are preferably used additionally as switch lights.

In FIG. 3c conductor panels mounted meander-shaped on a disc 102b connected rotationally secured to a setting wheel are used as the signal-producing elements. These are contacted through two electrical sliding contacts 103b. With a rotation of the disc 102b the voltage dropping over the two sliding contacts 103b periodically changes so that a periodic signal is produced. This is in turn supplied to the electronic control unit 104. This arrangement is particularly cost-effective.

Figure 4:
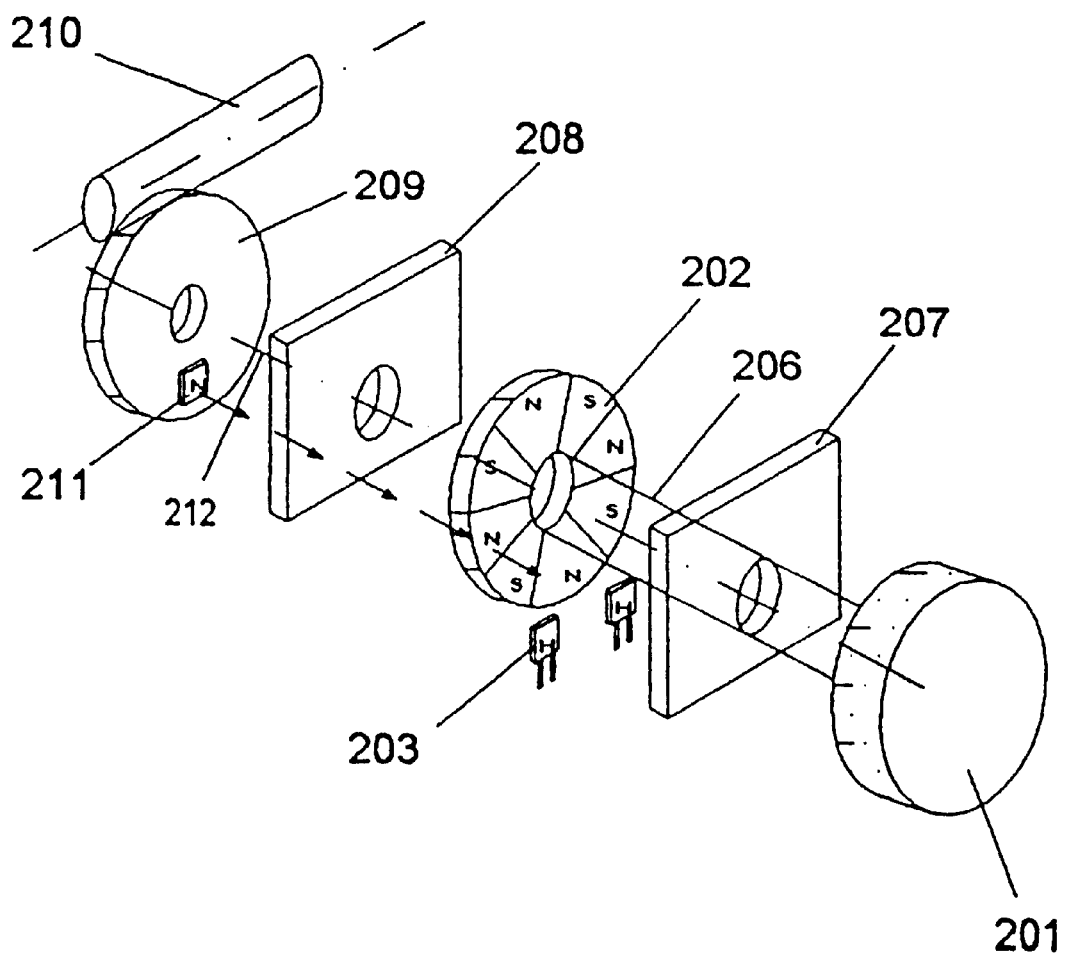
FIG. 4 is an explosive view of a second embodiment of a switching device according to the invention wherein a force coupling is produced between a permanent magnet in the displacement drive and a magnetic disc connected to the operating element.

A second embodiment of the switching device 10 according to the invention is shown in FIG. 4. As in FIG. 2 an endlessly rotating setting wheel 201 without absolute neutral position and without definite on/off states is provided as operating element. The wheel 201 is connected rotationally secured to a segmented magnetic disc 202 through a fixed axis 206. The magnetic disc 202 is associated with two echo sensors 203 which produce control signals for the electronic control unit in dependence on the rotation of the magnetic disc 202. The electronic control unit produces in turn control commands for the drive motor. For this reference is made to the explanations regarding FIG. 2.

According to FIG. 4 a worm gear is provided in the extension of the axis 206 and is mounted in a gear housing with a gear housing cover 208. It is thus a worm gear of the displacement drive which converts the rotational movement of the drive motor into a translation movement of the displacement object. Behind the housing cover 208, the worm wheel 209 of the worm gear is located on a straight line 212 with the axis 206. The worm wheel 209 and the magnetic disc 202 are thus mounted in parallel alignment behind each other along a straight line 212 but are not connected or rotationally secured with each other. The worm wheel 209 thereby meshes with a drive worm 210 which is coupled to the drive shaft of the drive motor. The worm wheel 209 is in turn connected to an output shaft (not shown) for driving a cable drum.

A permanent magnet 211 is fixedly mounted on the worm wheel 209. A magnetic force coupling is thereby provided between the permanent magnet 211 and the magnetic disc 202, as indicated by the arrow.

The method of functioning of this arrangement is as follows. Through a manual rotation of the setting wheel 201 and a corresponding rotation of the magnetic disc 202 firmly connected to the setting wheel 201 control signals are generated by the sensor elements 203 for the electronic control unit which code the rotary direction and rotary speed of the setting wheel 201 and magnetic disc 202. The drive motor of the displacement drive is controlled by the electronic control unit corresponding to the rotary speed of the setting wheel 201. The feedback on the actual displacement speed of the displacement object is through a sensor connected to the displacement drive. A speed regulation is thereby possible. Alternatively a constant control of the drive motor is carried out through the electronic control unit so that the drive motor is driven with a fixed rotational speed.

The drive shaft of the drive motor is fixedly connected to the worm 210 which meshes with the worm wheel 209. A rotary movement of the worm wheel 209 is thus initiated through the setting wheel 201.

After the rotary movement of the worm wheel 209 is initiated, from now on the magnetic disc 202 is entrained in rotation through the magnetic force coupling between the magnetic disc 202 and the permanent magnet 211 fixedly connected to the worm wheel 209. This entrainment is carried out even if on the part of the operator there is no longer any more engagement on the setting wheel 201. The co-rotated magnetic disc 202 produces as a result of its rotation further echo impulses whereby the drive motor is caused to rotate further. Only when the setting wheel 201 is stopped does the drive motor stop. Otherwise the object to be displaced moves up to a stop whereby the worm wheel 209 and thus also the magnetic disc 202 coupled magnetically to same come to a standstill and no more signals are generated in the echo elements 203.

This variation is preferably used in connection with a direct detecting anti-jamming protection system. To this end sensor devices which operate with or without contact are provided with their signals likewise being sent to the electronic control unit.

Figure 5:
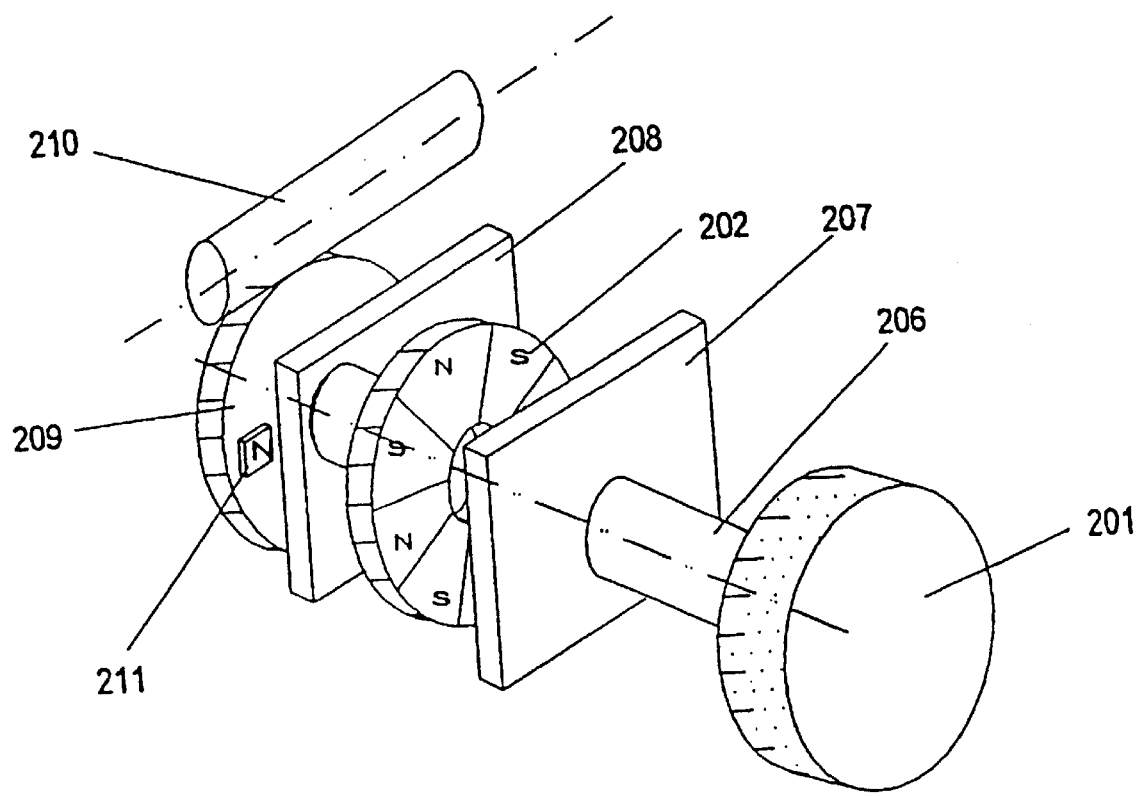
FIG. 5 is a further illustration of the embodiment of FIG. 4.

FIG. 5 shows a further illustration of the embodiment of FIG. 4. Here the worm wheel 209 has been turned with the permanent magnet 211 90 degrees relative to FIG. 4 and the magnetic disc 202 has been turned along accordingly. The cover 208 of the gearbox housing consists of a material which does not interfere with the magnetic force coupling between the segmented magnetic disc 202 and the permanent magnet 211. In particular a plastics material is used.

Figure 16:
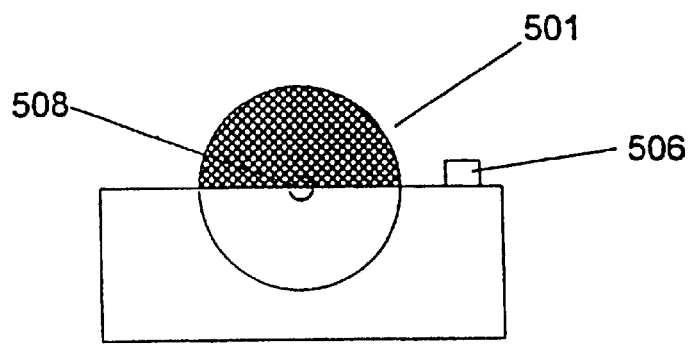
FIG. 16 shows an operating element formed as a ball.

In the embodiment of FIG. 16 the operating element is not an endlessly rotating setting wheel but a ball 501 which is rotatable about a definite axis 508. This is formed like a track ball as is used for example in cursor control elements in computers. Like the setting wheel, the track ball 501 has no absolute neutral position and has no definite on/off states. The track ball 501 has a regular magnetic pattern (not shown) e.g. corresponding to the facet arrangement of a football so that when the track ball 501 is moved a variable magnetic field appears with the sensor elements associated with this track ball 501. Control signals are generated and supplied to an electronic control unit. The additional functioning procedure is as described in relation to the embodiments of FIGS. 2, 4 and 5. The track ball 501 is preferably illuminated when switching on the driving lights for better handling.

Figure 17:
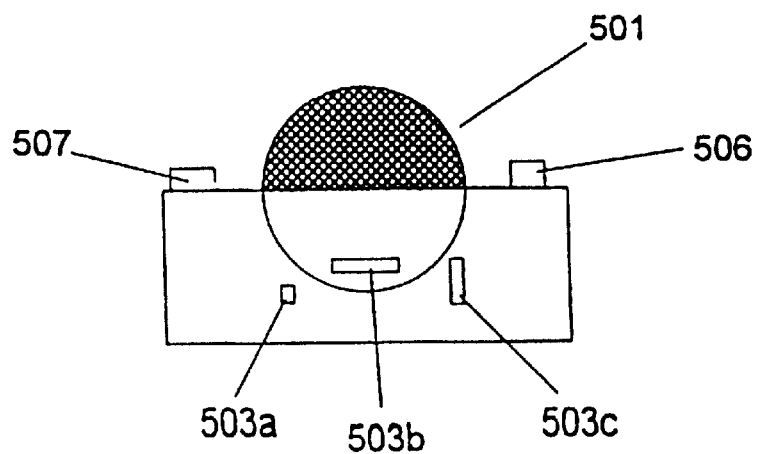
FIG. 17 shows a further operating element formed as a ball.

In the alternative design of the invention according to FIG. 17 the operating element formed as the track ball 501 is not only able to move about an axis but in any direction. The movement of the track ball 501 in the y-direction and z-direction is detected by sensor elements 503*a*, 503*b*, 503*c* and sent to an electronic control unit. An operating element of this kind is particularly suitable for mirror adjustment in a motor vehicle since the movement of the track ball 501 can act simultaneously on several adjustment axes of the mirror and thus code a displacement of the mirror about the y-axis and z-axis.

A deactivating switch 506 can be provided in the switching device through which the track ball 501 can be deactivated in order to avoid undesired displacement of the displacement object 501 through accidental turning of the track ball 501.

Furthermore a reverser switch 507 is provided through which two different drives can be selected as required. This design of the invention is particularly suitable for a switching device for controlling a window winder drive and a mirror adjustment of a vehicle. Depending on the choice of switch 507 either a mirror adjustment is carried out or a displacement of a window pane of the motor vehicle. If the track ball 501 which can be rotated in any direction is used for a window winder drive then the movement of the track ball 501 only about one axis is evaluated, i.e. signals of the track ball 501 into a direction which is not to be evaluated are ignored.

Figure 6:
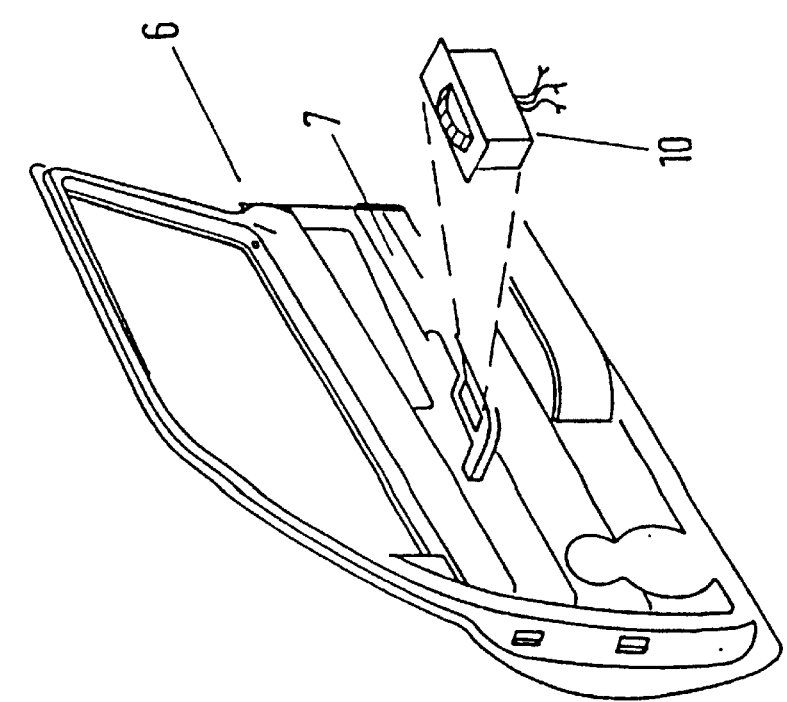
FIG. 6 shows a motor vehicle door with an operating element integrated in the arm rest.

FIG. 6 shows a motor vehicle door 6 wherein a switching device 10 for controlling a displacement drive according to the invention is integrated into the armrest 7. The manual access is thereby from above. In this variation the switching device 10 is connected to the displacement drive through electrical connections. The electronic control unit 4 (FIG. 1) is thereby preferably integrated into the gearbox housing so that a compact structural group is formed.

Figure 7:
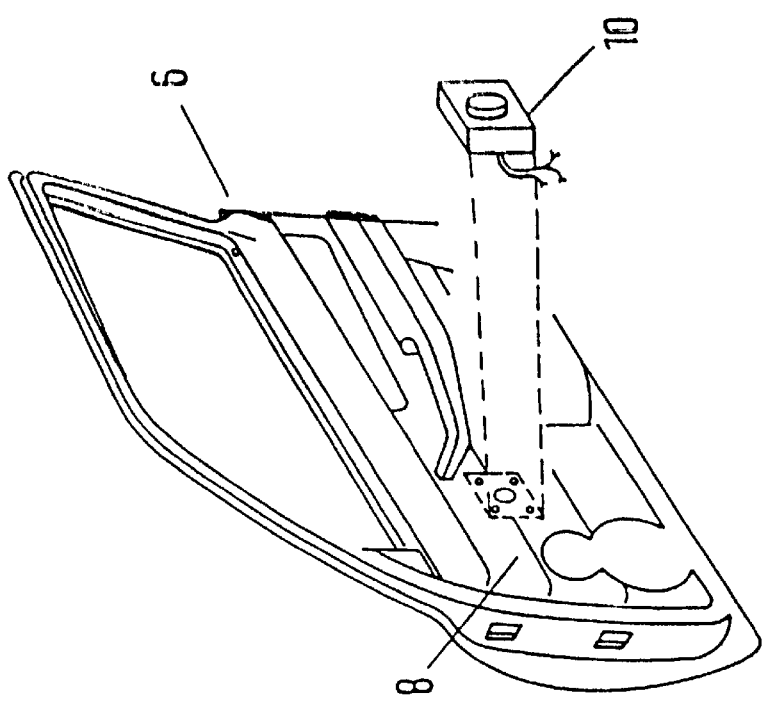
FIG. 7 shows a vehicle door with an operating element integrated in the door lining wherein the operating element is designed to be concealed.

In FIG. 7 the switching device 10 according to the invention is integrated in the inner door lining 8 of the motor vehicle door 6. The manual access is thereby from the side. The switching device 10 is designed concealed in the inner door lining 8 whereby the switching device 10 is pushed out through pressure through a spring and is thus easily accessible. When the switching device 10 is not in use there are no protruding contours. The principle corresponds to the principle of a ball point pen. The switching device 10 is in turn connected to the displacement drive 5 through electrical connections.

Figure 8:
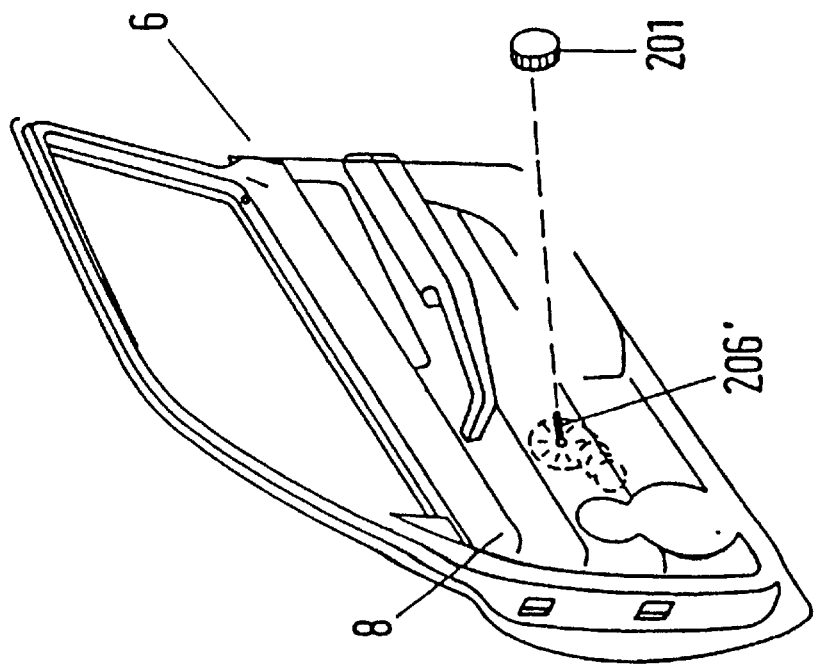
FIG. 8 shows a motor vehicle door with an operating element according to FIG. 4 in the door lining.

FIG. 8 diagrammatically shows a switching device according to FIGS. 4 and 5 which is located behind the door lining in the dry space of the motor vehicle door 6. Only the operating element 201 is integrated in the inner door lining 8. The switching device, the electronic control unit and the drive motor form except for the operating element 201 a modular unit which is mounted on a support plate whereby the magnetic disc 201 is mounted directly on the drive motor.

The operating element 201 is connected through a flexible shaft 206' to the magnetic disc 202 (cf FIGS. 4 and 5). The flexible shaft 206' allows a mechanically coupled rotary movement between the operating element 201 and the magnetic disc. This has the following advantage; If the window winder drive is inserted as a finished module into the inner door panel of a motor vehicle door 6 it is often necessary to take into account manufacturing tolerances of the corresponding socket areas for the module. These tolerances can amount to a centimeter. Since the window winder drives are designed as a unit tolerance compensation through structural measures on the window winder drive is rarely possible. By forming the connection of the operating element 201 mounted in the inner door lining 8 with the magnetic discs 202 mounted on the module as a flexible shaft 206' however it becomes possible to undertake tolerance compensation.

Figure 9:
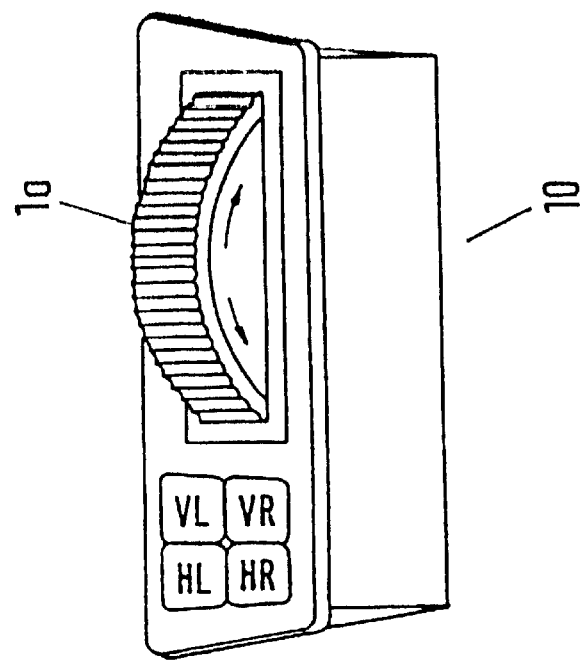
FIG. 9 shows a first embodiment of an operating element.

FIG. 9 shows a switching device 10 integrated according to FIG. 6 in the arm rest of a motor vehicle door. The setting wheel 1a is rotatable at will in both directions so that displacement of the window pane of the motor vehicle door can take place in the desired direction and at the desired speed. Through switch-over buttons VL, VR, HL and HR it is possible to select the window panes of the motor vehicle so that the window panes of one vehicle can be selected and adjusted individually or together centrally from the switching device 10 according to the corresponding selection.

Figure 10:
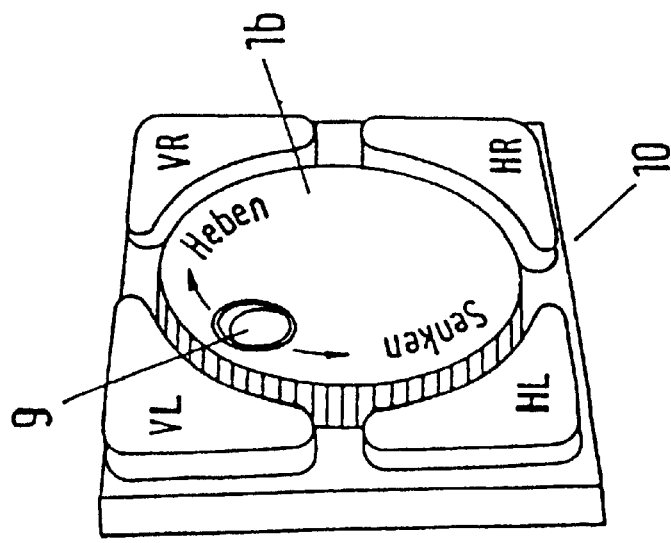
FIG. 10 shows a second embodiment of an operating element.

FIG. 10 shows a switching device 10 integrated in the door lining of a motor vehicle door wherein the setting wheel 1b can be concealed. With pressure on the setting wheel 1b this is pushed out by a spring so that the setting wheel 1b can also be operated from above. As a result of the operating recess 9 the setting wheel 1b is however easy to adjust even in the push-in position. Switch over buttons VL, VR, HL and HR are in turn provided for controlling the window of the motor vehicle.

Figure 11:
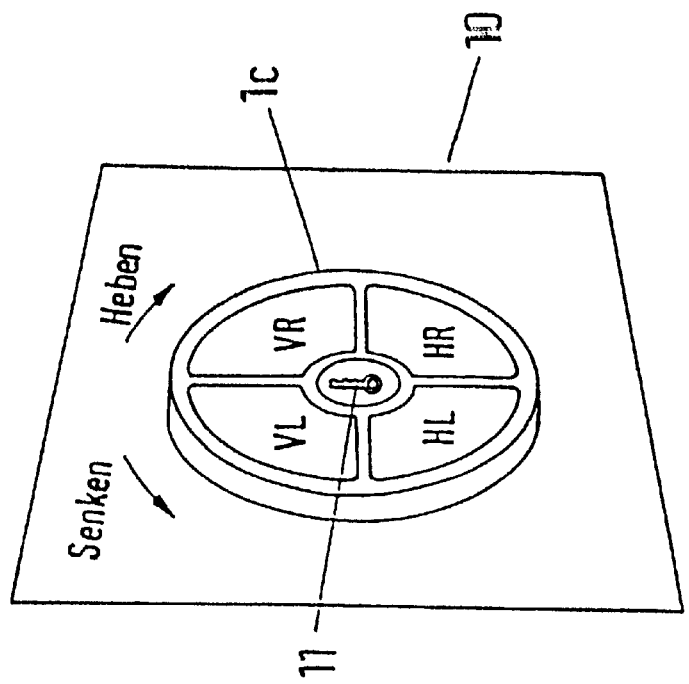
FIG. 11 shows a third embodiment of an operating element.

With the drop-down switching device 10 shown in FIG. 11 the switch over buttons VL, VR, HL and HR are integrated in the setting wheel 1c. Furthermore a switchover button 11 is provided for activating or deactivating a child lock. When activating the button 11 the windows in the back can no longer be displaced through the switches provided there.

Figure 12:
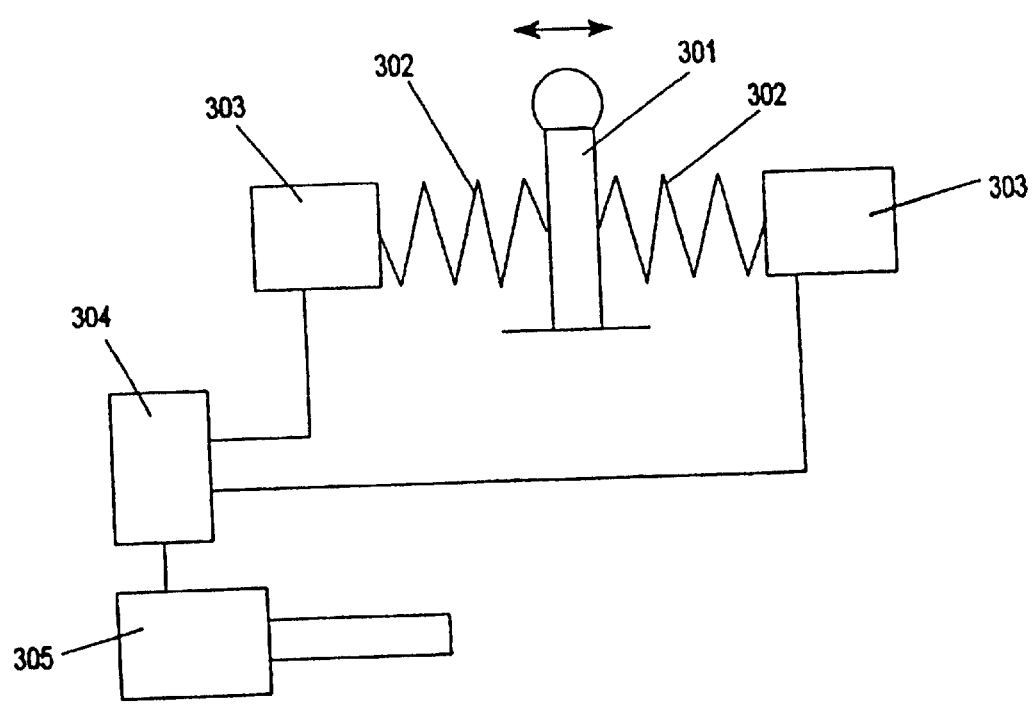
FIG. 12 shows diagrammatically a third embodiment of a switching device according to the invention wherein an articulated lever serves as the operating element.

FIG. 12 shows a third embodiment of the invention. An articulated lever 301 is used as the operating element and is connected to a sensor device 303 through a spring element 302. Starting from the rest position where the forces exerted by the springs 302 on the lever 301 are compensated, the lever 301 can be moved into two deflection directions. With one deflection of the lever 301 a spring 302 is tensioned each time. The incoming force is measured in the corresponding sensor element 303 and converted there into a binary impulse sequence. The frequency of the impulse sequence produced is proportional to the force arising.

With a sharp deflection of the lever 301 an impulse sequence is produced with a high frequency. The impulse sequence is supplied to the electronic evaluator unit 304 which generates control commands for the drive motor 305 as before. With a sharp deflection of the lever 301, a high spring force and a correspondingly high-frequency impulse sequence a rapid displacement of an object to be displaced is produced. The speed of adjustment of the displacement object is thus determined by the degree of displacement of the lever 301, i.e. the deflection or position of the lever 301 is determined whereby the deflection or position is associated with a certain impulse frequency.

Alternatively a tip switch is used in place of a lever with a basically similar arrangement whereby a certain impulse frequency of the control signals is associated with the degree of tipping.

Figure 13:
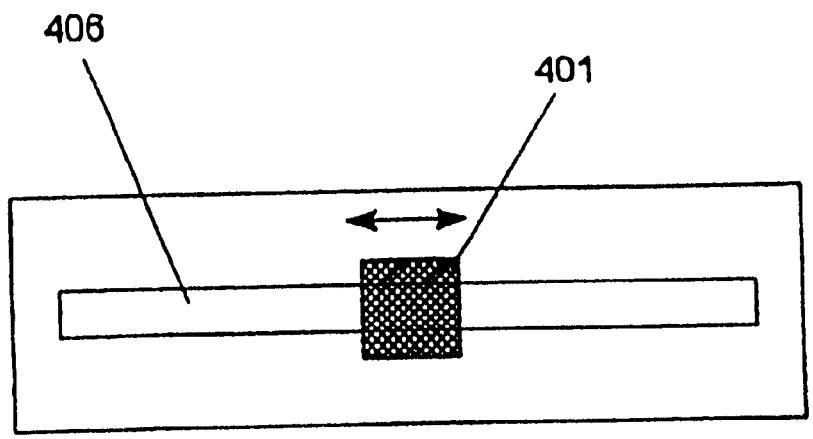
FIG. 13 shows diagrammatically a fourth embodiment of a switching device according to the invention wherein a slide element mounted in a slide guide serves as the operating element.
Figure 14:
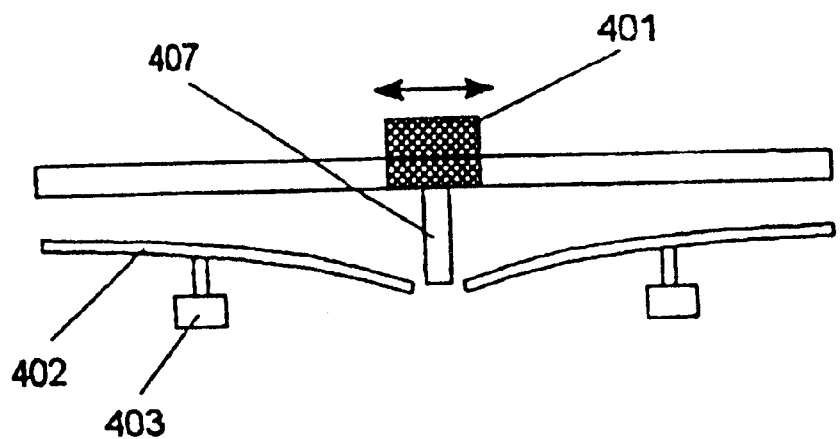
FIG. 14 shows diagrammatically a side view of the embodiment of FIG. 13.

A further embodiment of the invention is shown in FIGS. 13 and 14. The operating element of the switching device mounted in the arm rest of a motor vehicle is formed by a slide element 401 mounted in a slide guide 406 and having a definite neutral position from where it can be moved in two directions in the slide guide 406. According to FIG. 14 the slide element 401 during its displacement with a pin 407 deflects an elastic bending element 402.

The deflection of the bending element 402 is detected through a sensor element 403 and this value is assigned with a certain frequency of an impulse sequence so that according to the position of the slide element 301 a speed value is produced for the displacement of an object to be displaced. The impulse sequence is supplied as control signal to an electronic control unit. The stronger the deflection of the bending element the higher is the frequency of the impulse sequence so that a severe displacement of the slide element corresponds to a high displacement speed of the object to be displaced.

In order to detect the deflection of the bending element 402 expansion measuring strips for example are mounted on the bending element 402.

Alternatively a piezo element such as piezo ceramic column is provided as the sensor element 403. With an adjustment of the operating element 401 and an ensuing deflection of the elastic bending element 402 pressure is exerted on the piezo ceramic column 403 and leads to the production of a voltage. According to the level of the voltage an impulse sequence is provided with a frequency dependent on the voltage produced and sent to the electronic control unit. By using a piezo ceramic column 403 for each of the two bending elements 402 it is also possible to detect direction since only that piezo ceramic column 403 produces a signal which is biased with pressure during deflection of the operating element 401.

In a further alternative the deflection of the bending element 402 is associated with a certain resistance value when using expansion measuring strips and with a certain voltage value when using a piezo element. The resistance value or voltage value is supplied as a control signal to an electronic control unit. From the resistance value or voltage value the control unit determines the displacement speed of the object to be displaced. The stronger the deflection of the bending element so the greater is the resistance value or voltage value so that a severe displacement of the slide element corresponds with a high displacement speed of the object to be displaced.

In further alternatives of the invention in the case of the embodiments of FIGS. 13 and 14 an association of the frequencies of the control signal with fixed displacement speeds of a displacement of the object to be displaced according to FIG. 15 takes place through the electronic control unit.

In alternative embodiments (not shown) of an operating element which can be displaced starting from a neutral position into at least two deflection directions the speed of displacement of an displacement object is not or not only determined by the degree of displacement, i.e. the deflection of the operating element, but by the dynamics of the displacement of the operating element, more particularly the speed and/or acceleration of the operating element during displacement. Means are thereby provided which detect the speed and/or acceleration of the operating element. The speed value or acceleration value detected represents a measure of the displacement speed of the associated displacement drive. The displacement speed of the displacement drive and thus the displacement speed of an object to be displaced is thus set in dependence on the speed and/or acceleration of the operating element during its displacement.

The invention is not restricted in its design to the embodiments described above. Rather a number of variations are possible which make use of the invention even in basically different types of designs.

What is claimed is:

1. Functional control device for controlling an external force actuated displacement drive of a motor vehicle, the device comprising:

a manually operable rotatable operating element;

means for producing a signal associated with the operating element; and a control unit which, during rotation of the operating element, receives control signals from the means for producing a signal and, in dependence on the control signals produces control commands for a drive motor of the displacement drive, wherein, during rotation of the operating element, a control signal impulse sequence is produced, and wherein the control unit determines displacement speed for the displacement drive based on frequency of the control signal impulse sequence.

2. The device according to claim 1 wherein the means for producing a signal comprises:

sensor elements; and signal elements arranged on one of the operating element and on a part mechanically connected to the operating element, to alternatively interact with the sensor elements to produce control signals.

3. The device according to claim 2 wherein the signal elements comprise one of a wheel and a disc, and wherein one of the wheel and the disc is coupled to the operating element.

4. The device according to claim 3 wherein the signal elements further comprise one of magnetized areas on one of the wheel and the disc, perforated panels in one of the wheel and the disc, and resistance wire loops on one of the wheel and disc, which, to produce a signal, alternatively interact with one of at least one double-channeled echo sensor, a light barrier, and with electric sliding contacts, respectively.

5. The device according to claim 2 further comprising a flexible shaft, and wherein the operating element is operatively connected through the flexible shaft to the signal elements.

6. The device according to claim 2 wherein the operating element and the signal elements are mounted on an inner door lining of a motor vehicle door, and wherein the sensor elements and the control unit are mounted on a support plate of the motor vehicle door.

7. The device according to claim 1 wherein the means for producing signals produce, during a rotation of the operating element, a control signal impulse sequence whose frequency is proportional with the rotary speed of the operating element, and wherein the electronic control unit, as a result of properties of the control signal impulse sequence, determines, in addition to the displacement speed, one of displacement path, displacement position, duration of displacement and direction of displacement of an object to be displaced.

8. The device according to claim 7 wherein the control unit is biased with signals of a device for detecting the position of the displacement object.

9. The device according to claim 1 further comprising:

a segmented magnetic disc which is coupled to the operating element;

at least one twin-channel echo sensor which alternatively interacts with the magnetic disc and which produces control signals for the control unit in dependence on rotation of the magnetic disc;

a second disc whose axis of rotation lies on a straight line with an axis of rotation of the magnetic disc;

a permanent magnet which is fixedly connected to the second disc;

a coupling between the drive motor of the displacement drive and the second disc; and a magnetic force coupling between the magnetic disc and the permanent magnet so that a control of the drive motor initiated by the operating element and a rotation of the second disc connected therewith through the magnetic force coupling leads to an entrainment and continuous rotation of the magnetic disc, and thus to a likewise continuous control of the drive motor independently of a further manual operation of the operating element.

10. The device according to claim 9 wherein the second disc comprises a worm wheel of a worm gear of the displacement drive and wherein the permanent magnet is fixedly connected to the worm wheel.

11. The device according to claim 1 wherein the operating element includes an unrestricted rotatable ball.

12. The device according to claim 11 wherein the unrestricted rotatable ball has a uniform magnetic pattern.

13. The device according to claim 11 wherein the unrestricted rotatable ball is mounted in a manner resembling a track ball such that the unrestricted rotatable ball is rotatable manually in any direction.

14. The device according to claim 13 wherein the device is adapted for a mirror drive of a motor vehicle, wherein the unrestricted rotatable ball is operatively coupled to sensors for determining a displacement of the unrestricted rotatable ball in a y-direction and z-direction, and wherein the control signals causes a rotation of the mirror about a y-axis and z-axis.

15. The device according to claim 14 wherein the device is adapted for a combined mirror drive and window winder drive of a motor vehicle, and wherein the device further comprises a reverser switch for selecting one of the mirror drive and the window winder drive.

16. Functional control device for controlling an external force actuated displacement drive in a motor vehicle, the device comprising:

a manually operable operating element with a defined neutral position, means for producing control signals associated with the operating element, a control unit which, during operation of the operating element, receives control signals from the means for producing control signals and based on the received control signals produces control commands for a drive motor of the displacement drive, wherein the operating element starting from the neutral position is displaceable in at least two deflection directions, and wherein, during displacement of the operating element based on dynamics of the displacement, a control signal impulse sequence is produced and the control unit determines displacement speed for the displacement drive dynamically based on frequency of the control signal impulse sequence.

17. The device according to claim 16 wherein the operating element includes one of an articulated lever and a tip switch with a definite neutral position.

18. The device according to claim 16 wherein the operating element includes a slide element mounted in a slide guide with a definite neutral position.

19. The device according to claim 16 wherein the operating element is coupled in both deflection directions through a spring element, each with a sensor element which sends control signals to the control unit based on relevant position of the operating element.

20. The device according to claim 19 wherein the operating element, during displacement, deflects an elastic bending element and the deflection of the elastic bending element is detected through one of the sensor elements.

21. The device according to claim 20 further comprising expansion measuring strips mounted on the elastic bending element.

22. The device according to claim 20 further comprising a piezo element and wherein the elastic bending element exerts pressure on the piezo element during elastic deflection in order to produce a signal.

23. The device according to claim 16 wherein the operating element is integrated in one of the door lining and in the arm rest of a motor vehicle door and is capable of being lowered and concealed into one of the door lining and arm rest in a manner resembling a ball point pen.

24. The device according to claim 16 wherein the device is adapted for a window winder drive of a motor vehicle, and wherein the device further comprises switch over buttons for all window panes of the motor vehicle such that all the window panes of the motor vehicle are adjustable centrally from the device.

25. The device according to claim 24 further comprising a deactivation switch operatively coupled to the control unit.

26. Process for controlling an external force actuated displacement drive in a motor vehicle, the process comprising the steps of:

producing control signals using a manually operable operating element;

transmitting the control signals to an control unit for producing control commands for a drive motor of the displacement drive, and determining displacement speed for the displacement drive, wherein, the step of producing control signals comprises, producing, with a displacement of the operating element, a control signal impulse sequence based on dynamics of the displacement, and wherein the step of determining the displacement speed for the displacement drive comprises determining the displacement speed dynamically based on the frequency of the control signal impulse sequence.

27. Process according to claim 26 wherein the step of producing control signals further includes measuring one of a displacement path, position, duration of displacement and direction of displacement of an object to be displaced.

28. Process according to claim 27 wherein the step of producing control signals further includes measuring the frequency of the control signal impulse sequence, which represents a measure for a speed of displacement of the object to be displaced.

29. Process according to claim 27 wherein the step of producing control signals further includes measuring a number of impulses in the control signal impulse sequence within a certain time interval, which represents a measure for an exact displacement path of a displacement of the object to be displaced.

30. Process according to claim 29 further comprising the steps of:

assigning certain frequencies of the control signal impulse sequence with certain displacement speeds of a displacement of the object to be displaced such that impulse sequence frequencies lying below a first frequency value are associated with a speed, determined by the impulse sequence frequency and a variable, which is at least equal to a predetermined minimum displacement speed;

a constant mean displacement speed is assigned to impulse sequence frequencies lying between the first frequency value and a second frequency value and a maximum displacement speed is assigned to impulse sequence frequencies lying above the second frequency value.

31. Process according to claim 30 further comprising the step of assigning a constant minimum displacement speed to control signal impulse sequences with frequencies lying below the first frequency value.

32. Process according to claim 31 further comprising the steps of:

coupling a first signal element to the operating element; and coupling a second element to the drive motor of the displacement drive, the second element having a permanent magnet, wherein a magnetic force coupling takes place between the first signal element and the second element, and through the magnetic force coupling a control of the drive motor initiated by one of the operating element and first signal element, with a movement of the second element, lead to an entrainment of the first element, and thus to a further control of the drive motor.

33. Process according to claim 26 wherein the step of producing control signals further includes measuring the number of impulses in the control signal impulse sequence within a certain time interval to represent a measure for an exact displacement path of a displacement of the object to be displaced.

34. Process according to claim 33 further comprising:

assigning certain frequencies of the control signal impulse sequence to certain displacement speeds of a displacement of the object to be displaced such that impulse sequence frequencies lying below a first frequency value are associated with a speed, determined by the impulse sequence frequency and a variable, which is at least equal to a predetermined minimum displacement speed;

a mean displacement speed is assigned to impulse sequence frequencies lying between the first frequency value and a second frequency value and a maximum displacement speed is assigned to impulse sequence frequencies lying above the second frequency value.

35. Process according to claim 34 further comprising the step of assigning a constant minimum displacement speed to control signal impulse sequences with frequencies lying below the first frequency value.

36. Process according to claim 35 further comprising the steps of coupling a first signal element to the operating element;

coupling a second element to the drive motor of the displacement drive, the second element having a permanent magnet, wherein a magnetic force coupling takes place between the first signal element and the second element, and through the magnetic force coupling a control of the drive motor initiated by one of the operating element and first signal element with a movement of the second element, lead to an entrainment of the first element, and thus to a further control of the drive motor.

* * * * *